United States Patent [19]

Malone et al.

[11] Patent Number: 5,268,032
[45] Date of Patent: Dec. 7, 1993

[54] METHOD FOR THE CONTROLLED HARDENING OF ACID-SETTING BINDERS AND CEMENTS

[75] Inventors: Philip G. Malone; William N. Brabston, both of Vicksburg, Miss.

[73] Assignee: The United States of America as represented by the Secretary of the Army, Washington, D.C.

[21] Appl. No.: 961,796

[22] Filed: Oct. 16, 1992

[51] Int. Cl.$^5$ .......................... C04B 22/08; C04B 7/46
[52] U.S. Cl. .................... 106/723; 106/690; 106/711; 106/718; 106/746; 106/811; 106/817; 204/130; 166/248; 264/DIG. 43
[58] Field of Search .............. 106/690, 711, 719, 738, 106/817, 811, 819, 746, 723; 166/248, 285; 204/130; 264/DIG. 43

[56] References Cited

U.S. PATENT DOCUMENTS

| 828,976 | 8/1906 | Schneider | 204/130 |
|---|---|---|---|
| 1,977,756 | 10/1934 | Dutoit | 204/130 |
| 2,099,328 | 11/1937 | Casagrande | 204/130 |
| 4,082,561 | 4/1978 | Nakagawa et al. | 106/819 |
| 4,209,434 | 6/1980 | Wilson et al. | 106/35 |
| 4,961,790 | 10/1990 | Smith et al. | 106/819 |
| 5,015,351 | 5/1991 | Miller | 204/130 |

FOREIGN PATENT DOCUMENTS 3-112838 5/1991 Japan.

Primary Examiner—Mark L. Bell
Assistant Examiner—Michael Marcheschi
Attorney, Agent, or Firm—Luther A. Marsh

[57] ABSTRACT

The present inventions relates to a method for the controlled hardening of acid-setting cements and binders by first providing an acid-setting binder within a selected mold. Mixing with the binder an electrolyte to form a paste or slurry within the mold. Subjecting the paste or slurry mixture to electrolysis for a selected period of time or until the binder is sufficiently hardened whereby a hardened article is produced. Finally, removing the produced article from the mold.

19 Claims, No Drawings

METHOD FOR THE CONTROLLED HARDENING OF ACID-SETTING BINDERS AND CEMENTS

FIELD OF THE INVENTION

The present invention relates to binders and cements which require the addition of an acid component to permit hardening of the binder and more particularly to a method for the controlled setting of such binders and cements.

BACKGROUND OF THE INVENTION

Binders or cements which require acidic conditions to harden are well known in the prior art. For example, a zinc phosphate hydrate cement is produced by combining a metal oxide zinc powder with an acid such as phosphoric acid. When these two components are intermixed, rapid setting occurs and a high quality zinc hydrate cement will be formed.

Other acid-setting binders exist in the art and many have found wide use in a variety of industries. Acid-setting binders are used as dental cements, molding compositions when combined with fillers and reinforcing materials and as grouts to solidify loose soil, gravel or other building material.

Although these prior art cements have found wide acceptance, they possess certain drawbacks in practical application. Conventional methods require mixing of the cement components prior to placement within a suitable mold. As a result, the intermixed components tend to "set" prior to completion of the molding process. This premature hardening of the cement often results in a flawed product or clogged and damaged equipment. In addition, the rapid setting characteristic of the cement requires that all the mixing equipment be fully and completely cleaned immediately after transfer of the cement to the mold.

If an acid-setting cement or binder is used to produce a hollow article, conventional casting techniques require a mold which can be tumbled, rotated or rocked to allow a layer of unreacted cement to be uniformly distributed within the mold's interior. Consequently, loading of the mixed cement components within such casting equipment requires great care in order to ensure that none of the cement will set prior to complete coating of the interior of the mold.

Yet another disadvantage of acid-setting binders and cements is the need to prepare in advance the strong acid for addition to the metal oxide powder. Handling and preparation of such acids can be hazardous and requires great care on the part of the user. Further, articles produced with conventional acid-setting binders or cements are restricted by the type and number of filler materials which can be employed. Time constraints in terms of mixing and the need to avoid premature setting often make the inclusion of fillers within a finished product impractical or will yield a product of inferior quality.

Even though acid-setting cements and binders have found wide acceptance within the construction and molding industries, the uncontrolled speed at which they set has restricted their expansion into other technologies. A need has therefor existed within the art for acid-setting cements or binders which can be controllably hardened and in so doing avoid the aforementioned problems.

OBJECTS AND SUMMARY OF THE INVENTION

Accordingly, it is an object of the present invention to provide a method for the controlled hardening of an acid-setting cement or binder thereby preventing premature setting, flaws within the item being cast and clogged or damaged mixing equipment.

Another object of the present invention is to provide a method for setting a binder whereby an acid reactant or catalyst is produced in situ thereby eliminating the need for the preparation of a separate acid solution for mixing with the metal oxide cement.

A still further object of the present invention is to provide a method to control the hardening of an acid-setting cement whereby a hollow item can be cast without the need for equipment which spins or otherwise rotates.

Yet another object of the present invention is to provide a method for producing a cast item having portions which are selectively hardened to yield a uniquely shaped item without the need for expensive and complicated casting equipment.

Still another object of the present invention is to provide a method for the controlled hardening of an acid-setting cement whereby the mold itself is an operating electrochemical cell.

A still further object of the present invention is to provide a method for hardening acid-setting cements and binders whereby the molded end product contains various aggregates and fillers.

Yet another object of the present invention is to provide a method for the controlled hardening of an acid setting cement whereby the molded end product contains no flaws and meets the high tolerance requirement of precision casting techniques.

A still further object of the present invention is to provide a method for the controlled hardening of acid-setting cements whereby the components for producing the acid-setting cement are uniformly mixed prior to hardening so as to provide a high quality end product.

Another object of the present invention is to provide a method for the controlled hardening of acid-setting cements regardless of ambient temperature.

These and other objects are achieved by providing a method for the controlled hardening of acid-setting cements comprising the steps of first providing an acid-setting binder within a selected mold. Mixing with the binder an electrolyte to form a slurry or paste. Subjecting the mixture to electrolysis for a selective period of time or until the binder is sufficiently hardened whereby a hardened article is produced. Removing the produced article from the mold.

The present invention also relates to a method for the controlled hardening and strengthening of loose or granular soil or gravel into a cohesive mass and comprising the steps of first providing an acid-setting grout or binder. Mixing with the grout or binder an electrolyte solution to form a slurry or paste. Injecting the slurry or paste into the granular soil or gravel to completely saturate the soil or gravel and subjecting the injected mixture to electrolysis for a selective period or time or until the grout or binder is sufficiently hardened whereby a cohesive, hardened mass is produced.

DETAILED DESCRIPTION OF THE PREFERRED EMBODIMENT

According to the preferred embodiment of the present invention the method for controlling the hardening of an acid-setting cement comprises the following steps:
1. An acid-setting binder such as powdered zinc oxide is place within a selected mold or mixing container.
2. The powered zinc oxide is intermixed with an alkali salt solution. For example, a sodium phosphate salt solution is added to the powered zinc oxide to create a uniformly distributed slurry or thick paste.
3. The mixture of acid-setting binder and electrolyte is then placed within a mold and subjected to electrolysis for a selected period of time or until the binder is sufficiently hardened. The electrolysis may be brought about by simply placing a conventional anode and cathode within the slurry mixture and providing an electrical current therebetween to complete a circuit.
4. After sufficient hardening, the molded article is removed from the mold and the mold is ready for the next operation.

Applicant's have discovered that the electrochemical reaction which takes place within the slurry or paste yields an oxidation reaction at the anode causing the in situ production of an acid. This acid will then react with the intermixed metal oxide powder to yield the end product cement.

More specifically, the powered zinc oxide and the sodium phosphate salt solution react in a two step reaction process by the (1) initial production of a phosphoric acid followed by (2) reaction of the phosphoric acid with the zinc oxide to yield the zinc phosphate cement product. This two step reaction process is given below:

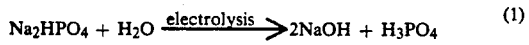

$$Na_2HPO_4 + H_2O \xrightarrow{electrolysis} 2NaOH + H_3PO_4 \quad (1)$$

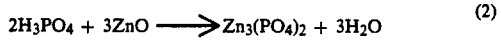

$$2H_3PO_4 + 3ZnO \longrightarrow Zn_3(PO_4)_2 + 3H_2O \quad (2)$$

A wide variety of acid-setting cements are contemplated within the scope of the present invention. For example, calcium hydroxide powder may be slurried with a sodium sulfate electrolyte solution. If subjected to electrolysis, a sulfuric acid is produced which then reacts with the calcium hydroxide to form a solid calcium sulfate hydrate cement also known as gypsum. Other "acid-setting" cements and binders are contemplated as being within the scope of the present invention. The primary requirement of the acid-setting binder according to the present invention is that it react with an acid produced during the electrochemical reaction.

The present invention encompasses a variety of electrolytes for mixture with the selected binder. Generally speaking, any of the alkali metal salts are contemplated as being within the scope of the present invention. Sodium or potassium phosphate salts should work well with the zinc or calcium oxide powders. Applicant's have also found that alkali sulphate salts will produce upon electrolysis sulphuric acid that will set calcium hydroxide forming calcium sulphate hydrate. The present invention is not limited to any particular electrolyte and includes all electrolytes which upon electrolysis produce acids at the anode of the cell and in sufficient quantities to react with and cause the cement to set.

Regardless of the acid-setting binder selected, in all cases the electrolysis reaction is the primary means to control the pH of the mixture and thereby produce an acid which will then set the binder. In the most general terms, electrochemical reactions are those chemical changes associated with the passage of electrons across the interface between a conductor and solution. Thus, an electrochemical cell usually contains a pair of metallic or carbon electrodes which are immersed within an electrolyte solution. When an electrical current is established between the electrodes, positively charged ions move towards the cathode electrode while negatively charged ions move toward the anode electrode. The electric current is carried through the electrolyte by this migration of ions and serves to cause chemical change. More importantly for the present invention, there are produced at the positive electrode or anode acidic compounds as well as liberated oxygen gas.

Although an associated rise in temperature results from the electrochemical reaction, applicant's have found that the hardening of the acid-setting binder is due primarily to the generation of acid at the anode and not to incidental drying from the heat of the chemical reaction. Applicant's find it useful to routinely add electrolyte solution to the mixture during the electrochemical reaction therby ensuring a constant supply of generated acid as well as to keep the electrodes immersed within the electrolyte solution. In general, high concentrations of electrolyte solutions are preferred in order to provide maximum acid production at the anode.

The rate at which the current is applied is not critical since it is the total current applied which determines the amount of acid generated. Applicant's have found that both metal and non-metal (carbon) electrodes work equally well so long as the selected electrode is relatively inert and does not react at a speed sufficient to change the composition of the binder-electrolyte mixture.

Applicant's have further discovered that by raising the voltage during the electrolytic reaction, an increase in the rate of acid production is observed thereby increasing the rate of hardening of the metal oxide cement. Conversely, a lowering of the voltage during the electrolytic reaction tends to decrease the production of acid with an associated lowering of the rate of hardening of the metal oxide cement. As a result, the rate of hardening of the cement according to the present invention can be selectively controlled depending upon the particular application of the cement.

A variety of aggregates or fillers may be added to the metal oxide and electrolyte paste or slurry prior to or during electrolysis. Preferred aggregates and fillers include sand, clay, ground ceramics and glasses. The flexural or tensile strength of the metal oxide and electrolyte slurry or paste can be increased by the addition of fiber, woven fabrics or other material which is not readily subject to attack by the acid. Preferred fibers are generally spun or extruded glasses or silicas or synthetic organic fibers and plastics. The present invention is not limited to a particular group of aggregates and fillers but is intended to encompass the variety of such additives as is generally known in the art.

It is within the scope of the present invention to provide a mold for use with a acid-setting binder which permits the molding of hollow items from a slurry or paste without the prior art necessity for associated rocking or spinning means. For example, a metal or carbon anode can be made part of or integral with the exterior mold surface while the cathode is positioned within the interior portion of the mold. When a current is applied, the slurry or paste within the mold will selectively harden along the interior (anode) surface of the mold while slurry or paste adjacent the cathode will remain soft. The resultant article is a hardened shell reflecting the shape of the anode and containing unreacted paste. The unreacted slurry or paste can then be recovered for use in manufacturing additional articles.

In yet another embodiment according to the present invention the anode is selectively moved within the mold to a variety of locations by robotics or other means followed by the application of current. As a result, a product can be tailor-made to contain localized portions of hardening which would be otherwise unavailable.

It is additionally within the scope of the present invention to provide a method for controllably hardening and strengthening of loose and granular material such as soil or gravel into a cohesive mass. In this embodiment, the acid-setting binder and electrolyte slurry are uniformly pumped or otherwise injected and intermixed with the granular material. After positioning electrodes within the mass, a current is applied and the mixture is subjected to electrolysis. In this way, premature setting is avoided and the acid-setting binder and electrolyte are completely filled within the intergranular spaces of the soil or gravel prior to hardening. In addition, the electrodes can serve after hardening as reinforcing or attachment points.

In order to demonstrate the method according to the instant invention, the following examples are offered. It should be appreciated that these are merely examples to show the utility and effectiveness of some of the embodiments of the recent invention. Inclusion of these examples should not be interpreted in any manner as limiting to the scope of the present invention to the specific conditions set forth in the examples.

EXAMPLE I

A test electrolytic cell was set up in a glass beaker by adding 30 grams of monobasic sodium phosphate hydrate to 100 ml of distilled deionized water to form 2 molar solution. The initial pH of the solution was approximately 4.5. A volume of 200 ml of zinc oxide powder was mixed into the solution to form a thick paste. Two stainless steel rods (8 mm in diameter) were partly immersed in the paste to form an electrolytic cell. The electrodes were held suspended in the solution with a plastic clamp that provided an electrode separation of 5 cm. A DC current of 1 ampere was set and allowed to run through the cell for two hours. The pH at the anode dropped to 1.0. Gases bubbled from both the anode and cathode indicating electrolysis was occuring. The temperature in the cell rose from an initial temperature of 25° C. to a final temperature of 45° C. At the end of the test run (2 hours), the current was shut off and the electrodes were removed from the paste. The zinc oxide paste at the cathode was soft and the hole which had formed within the paste around the electrode collapsed upon itself. The paste at the anode was hardened and the adjacent hole remained open when the electrode was removed. The cell was permitted to cool for one hour. The hardened paste at the anode was removed by washing out the soft paste in the cell and separating the hardened portion around the anode. The sample of the hardened paste was examined using standard x-ray diffraction techniques. The hardened paste was found to consist of a mixture of zinc oxide and zinc phosphate hydrate cement (a synthetic hopeite).

EXAMPLE II

In a second experimental run, an identical test cell to that given in Example I was assembled but 8 mm diameter carbon rods were substituted for the stainless steel electrodes. A DC current of 0.5 amperes was passed through the cell for two hours. A cemented cylinder or hole formed around the anode similar to that observed in Example I. Examination of the cemented material using standard x-ray diffraction demonstrated that the cemented product produced was zinc phosphate hydrate cement.

EXAMPLE III

Approximately 100 ml of a saturated solution of sodium sulphate decahydrate (67% solution) was mixed with a 200 ml volume of finely divided calcium hydroxide to form approximately 150 ml of a stiff paste. Two 8 mm diameter carbon rods were inserted in the paste to act as electrodes. The electrodes were maintained at a separation distance of 5 cm. A current of 1 ampere was passed through the paste for ten minutes. The initial pH of the paste was 12.4. After two minutes, the pH in the vicinity of the anode had dropped to 2.0. Gases bubbled from both the anode and the cathode indicating that electrolysis was occurring. After ten minutes of operation the temperature of the paste had risen from the starting temperature of 25° C. to 46° C. Hardened paste was observed in the volume surrounding the anode. The current was shut off and the cell was allowed to cool for approximately 35 minutes. The hardened paste that formed at the anode was recovered by washing out the soft paste in the reaction cell. The hardened paste was examined using standard x-ray diffraction techniques and was found to be composed of calcium sulphate dihydrate (gypsum) along with some unreacted calcium hydroxide.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What we claim is:

1. A method for the controlled hardening of acid-setting cements or binders comprising the steps of:
   a) adding an acid-setting binder or cement in a mold or container;
   b) mixing with the binder or cement an electrolyte to form a slurry or paste;
   c) subjecting the mixture to electrolysis for a period of time until the binder is sufficiently hardened whereby a hardened article is produced; and,
   d) removing the produced article from the mold or container.

2. The method according to claim 1 and wherein:
   a) the acid-setting binder is selected from the group consisting of zinc oxide and calcium hydroxide.

3. The method according to claim 1 and wherein:
   a) the electrolyte is an alkali salt solution.

4. The method according to claim 3 and wherein:

a) the alkali salt solution is selected from the group consisting of alkali phosphate salt solutions and alkali sulfate salt solutions.

5. A method according to claim 1 and including the step of:
   a) raising the voltage during electrolysis to increase the rate of hardening of the cement or binder.

6. The method according to claim 1 and including the step of:
   a) lowering the voltage during electrolysis to decrease the rate of hardening of the cement or binder.

7. The method according to claim 1 and including the step of:
   a) adding a filler material to the filler prior to electrolysis, the filler being selected from the group consisting of sand, clay, ceramic particles, glass particles, silica fibers cloth fibers, plastic fibers and plastic granules.

8. The method according to claim 1 and including the step of:
   a) adding additional electrolyte to the mixture during electrolysis.

9. The method according to claim 1 and wherein:
   a) the mold is associated with an electrolytic cell having at least one anode electrode and one cathode electrode.

10. The method according to claim 9 and wherein:
    a) the mold is a shaped, hollowed anode structure having a cathode positioned therein.

11. The method according to claim 9 and including the step of:
    a) moving the anode within the mold to provide localized hardening of the cement or binder.

12. The method according to claim 10 and including the step of: .
    a) removing the unreacted slurry or paste from the mold to yield a hollow, hardened article.

13. The method according to claim 9 and wherein:
    a) the electrodes are stainless steel or carbon.

14. A method for the controlled hardening and strengthening of loose and granular soil or gravel into a cohesive mass comprising the steps of:
    a) adding an acid-setting grout or binder;
    b) mixing with the grout or binder an electrolyte solution to form a slurry or paste;
    c) injecting the slurry or paste into the granular soil or gravel to completely and uniformly saturate the soil or gravel; and,
    d) subjecting the injected mixture to electrolysis for a period of time or until the grout or binder is sufficiently hardened whereby a cohesive, hardened mass is produced.

15. A method according to claim 14 and including the step of:
    a) adding one or more anode electrodes within the injected granular soil or gravel to subject the injected mixture to electrolysis.

16. A method according to claim 14 and wherein:
    a) the acid-setting binder is selected from the group consisting of zinc oxide and calcium hydroxide.

17. A method according to claim 14 and wherein:
    a) the electrolyte is an alkali salt solution.

18. The method according to claim 17 and wherein:
    a) the alkali salt solution is selected from the group consisting of alkali phosphate salt solutions and alkali sulfate salt solutions.

19. The method according to claim 14 and including the step of:
    a) raising the voltage during electrolysis to increase the rate of hardening of the injected mixture.

* * * * *